US006931258B1

(12) United States Patent
Jarnstrom et al.

(10) Patent No.: US 6,931,258 B1
(45) Date of Patent: Aug. 16, 2005

(54) RADIOPHONE PROVIDED WITH AN OPERATION KEY WITH MULTIPLE FUNCTIONALITY FOR HANDLING ACCESS TO A MENU STRUCTURE

(75) Inventors: Johanna Jarnstrom, Turku (FI); Heidi Jorgensen, Hillerod (DK)

(73) Assignee: Nokia Mobile Phones Limited, Espoo (FI)

( * ) Notice: Subject to any disclaimer, the term of this patent is extended or adjusted under 35 U.S.C. 154(b) by 0 days.

(21) Appl. No.: 09/506,582

(22) Filed: Feb. 18, 2000

(30) Foreign Application Priority Data

Feb. 22, 1999 (GB) .................................... 9904019

(51) Int. Cl.⁷ .............................................. H04M 1/00
(52) U.S. Cl. .................. 455/550.1; 455/90; 455/575.1; 379/368; 379/433.06; 715/786
(58) Field of Search .......................... 455/90, 566, 550, 455/575; 379/433.06, 433.07, 368, 433.01; 715/786, 810

(56) References Cited

U.S. PATENT DOCUMENTS

| | | | | |
|---|---|---|---|---|
| 5,371,788 A | * | 12/1994 | Baals et al. .................. | 379/396 |
| 5,737,394 A | * | 4/1998 | Anderson et al. ......... | 379/88.11 |
| 5,841,849 A | * | 11/1998 | Macor .................... | 379/142.17 |
| 5,892,475 A | * | 4/1999 | Palatsi ........................ | 715/810 |
| 6,065,673 A | * | 5/2000 | Kokkila ....................... | 235/379 |
| 6,097,964 A | * | 8/2000 | Nuovo et al. ................ | 455/550 |
| 6,125,287 A | * | 9/2000 | Cushman et al. ........... | 455/566 |
| 6,215,474 B1 | * | 4/2001 | Shah .......................... | 345/168 |
| 6,310,609 B1 | * | 10/2001 | Morgenthaler .............. | 345/170 |
| 6,332,024 B1 | * | 12/2001 | Inoue et al. ........... | 379/433.06 |
| 6,366,302 B1 | * | 4/2002 | Crosby et al. ............... | 715/786 |
| 6,381,468 B1 | * | 4/2002 | Larsen et al. ................ | 455/550 |
| 6,415,164 B1 | * | 7/2002 | Blanchard et al. .......... | 455/566 |
| 6,463,304 B2 | * | 10/2002 | Smethers .................... | 455/566 |

FOREIGN PATENT DOCUMENTS

| | | |
|---|---|---|
| EP | 0 633 684 A2 | 1/1995 |
| EP | 0633684 | * 11/1995 |
| EP | 0 844 778 A2 | 5/1998 |

(Continued)

OTHER PUBLICATIONS

Electronic user's guide released subject to "Nokia User's Guides Terms and Conditions", Nokia Corporation, Finland, 9351434, Issue 2, released to public Mar. 1996.

(Continued)

*Primary Examiner*—Stephen D'Agosta
(74) *Attorney, Agent, or Firm*—Antonelli, Terry, Stout & Kraus, LLP

(57) ABSTRACT

A radiophone, arranged to assume a plurality of states, that includes a user interface provided with a display, a keypad, and control means. The keypad is arranged to enter the plurality of states, which changes the plurality of states. The keypad includes a first group of keys and a second group of keys that includes two soft keys with multiple functionality for handling access to a menu structure, and a scroll key to scroll between a group of items in a menu of said menu structure. The control means is arranged to control the display of an action, from said group of actions, as a default function, and to detect a state change event, which will change the state of the radiophone and redefine the functionality of the two soft keys in response to the preceding state and the nature of the detected state change event.

20 Claims, 3 Drawing Sheets

FOREIGN PATENT DOCUMENTS

| | | | | |
|---|---|---|---|---|
| EP | 0 860 972 A | | 8/1998 | |
| GB | 2329094 | * | 3/1999 | ........... H04M 1/02 |
| GB | 2329094 A | | 10/1999 | |
| WO | WO 98/27760 | | 6/1998 | |

OTHER PUBLICATIONS

Electronic user's guide released subject to "Nokia User's Guides Terms and Conditions", Nokia Corporation, Finland, 9351306, Issue 4, released to public Feb. 1997.

* cited by examiner

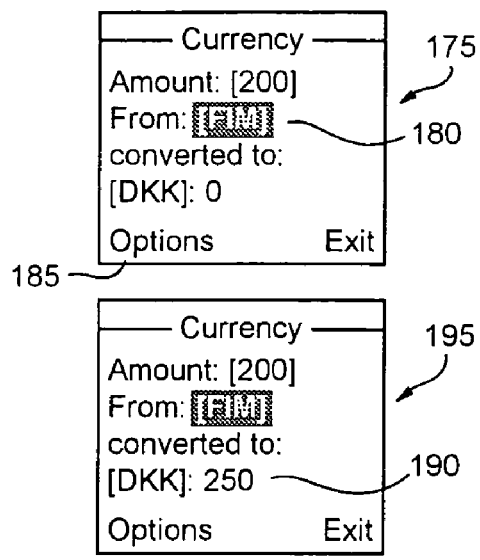
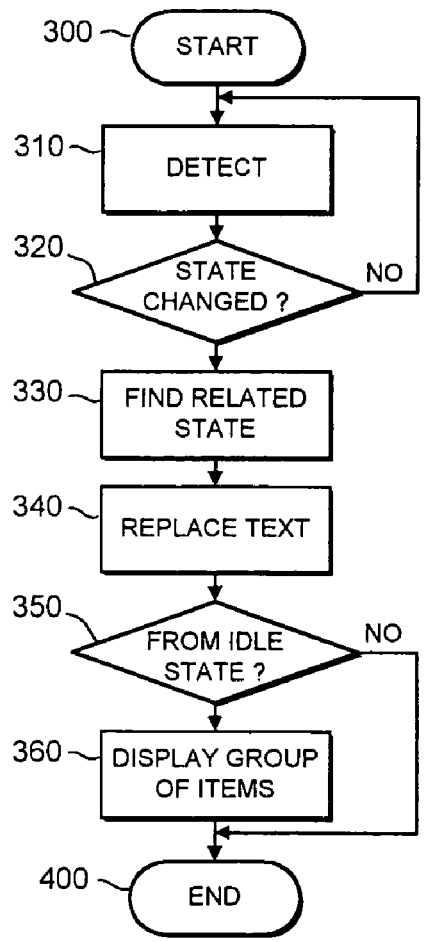
FIG. 3b
FIG. 4

RADIOPHONE PROVIDED WITH AN OPERATION KEY WITH MULTIPLE FUNCTIONALITY FOR HANDLING ACCESS TO A MENU STRUCTURE

BACKGROUND OF THE INVENTION

The present invention relates to a radiophone provided with an operation key with multiple functionality for handling access to a menu structure.

The term "radiophone" covers a portable unit provided with a transmitter/receiver, which is capable of transmitting signals with speech and/or data via electromagnetic waves/radio waves to another unit comprising a transmitter/receiver.

The phones sold by the applicants, as for example the models Nokia 5110™, Nokia 6110™ and Nokia 8810™, are exponents of the presently dominating user interface style based on two menu handling keys (soft keys) with multiple functionality for accessing different features in the phone. These features can e.g. be user settings, handling messages, setting call options, security options, etc. In idle mode, the two soft keys on e.g. Nokia 6110™ and Nokia 8810™ allow access to the menu structure and the phone book, respectively. The phone book is a phone number database stored on the SIM card of the phone and/or in the memory in the phone itself. The call handling is handled by two other keys—one for establishing or answering a call and one for terminating a call. Even if the soft keys facilitate the access to different features, the users desire an even more well-arranged and manageable keypad.

One example of an improvement is disclosed in GB-A-2,319,691, which describes a user interface for a radiophone. The radiophone comprises a user interface and a controller unit connected to the user interface. The user interface comprises a display and a keypad having an operation key, of which function is controlled by the controller unit and is displayed in a predetermined area of the display. The radiophone is capable of assuming a plurality of states in which a group of predetermined actions associated with the state concerned may be performed by the operation key. The controller unit displays one of the actions as a default function in the predetermined area of the display. This improvement as disclosed in GB-A-2,319,691 provides a user interface for a radiophone, which facilitates the normal operation for accessing different features in the radiophone.

Another example of an improvement is disclosed in GB-A-2,322,512, which also describes a user interface for a radiophone. The radiophone is provided with a user interface including a single multi-functionality key with multiple functionality, including call handling. The functionality of the multi-functionality key is displayed on a display, and is controlled by a controller. The controller monitors the information displayed on the display and controls the functionality of the multi-functionality key in dependence of the displayed information. This means that the call handling keys can be included in a single menu handling key, instead of having separate call handling keys. Thus, this improvement as disclosed in GB-A-2,322,512 provides a user interface for a radiotelephone which facilitates the normal operation. This improvement is also a very appreciated feature called NaviKey™ in the applicant's phone Nokia 3110™.

However, even if both GB-A-2,319,691 and GB-A-2,322,512 provide a well-arranged and manageable user interface, it is a general desire to facilitate the access to predetermined actions associated with a state when the radiophone is in an idle state. For example, upon pressing on a key on the alphanumerical keyboard on the phone, it is desired to facilitate the access to features which are related to actions affected by the alphanumerical keyboard.

SUMMARY OF THE INVENTION

The main object of the present invention is to provide a radiophone provided with an operation key, which enables an easy access to predetermined actions associated with a state when the radiophone is in an idle state. Thus, upon pressing on a key on e.g. an alphanumerical keyboard on the phone, it shall be easy to access different features related to actions caused by the alphanumerical keyboard.

One particular advantage of the invention is that it is possible to receive a menu with several options, upon pressing on a key in a first group of keys, e.g. an alphanumerical key, in idle mode, and thereafter pressing on an operational key. In some of the preferred embodiments of the invention, these options can be e.g. saving a number, call a number, add numbers, send messages, convert currencies and/or calculate. Thus, it will be very easy to access different features which are related to actions affected by the first group of keys. In this way, it may no longer be necessary for the user to browse among the plurality of menus in the menu structure, when he/she is going to use a feature related to an input from the first group of keys. Instead, the user gets a fast access to the menu items, when using the first group of keys, in combination with the operational key.

Further advantages of the present invention will be apparent from the dependent claims.

BRIEF DESCRIPTION OF THE DRAWING

The invention will be described in greater detail in the following by way of example only and with reference to the attached drawings, in which FIG. 1 schematically illustrates a preferred embodiment of a hand portable phone according to the present invention, FIG. 2 schematically shows the essential parts of a telephone for communicating with a cellular or cordless network, FIGS. 3 a, b shows a sequence of images as an example of a user interface in a phone according to the present invention, and FIG. 4 shows a flowchart of the decision process in the control means in a phone, in accordance with the present invention.

DETAILED DESCRIPTION OF EMBODIMENTS

Figure 1:
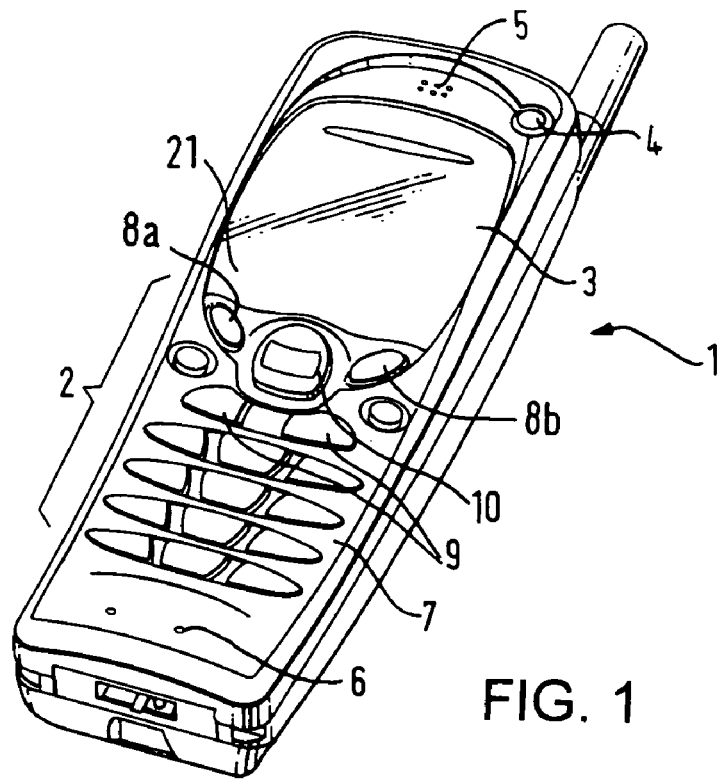

FIG. 1 shows a preferred embodiment of a cellular telecommunication apparatus, hereafter also referred to as a radiophone or just phone, according to the present invention. The radiophone, which is generally designated by 1, comprises a user interface having a keypad 2, a display 3, an on/off button 4, a speaker 5, and a microphone 6. The phone 1 according to the preferred embodiment is adapted for communication via a wireless telecommunication network, e.g. a cellular network. However, the phone could also have been designed for a cordless network.

The keypad 2 has a first group of keys 7, e.g. alphanumeric keys, by means of which the user can enter a telephone number, write a text message (SMS), write a name (associated with the phone number), etc. Each of the twelve alphanumeric keys 7 is provided with a figure "0–9" or a sign "#" or "*", respectively. In alpha mode each key is associated with a number of letters and special signs used in text editing.

The keypad 2 additionally comprises a second group of keys provided with two soft keys 8, two call handling keys 9, and a navigation key 10. The two soft keys 8 have a functionality corresponding to what is known from e.g. the phones Nokia 2110™ and Nokia 8110™. At least one of the soft keys is defined as an operation key 8a having multiple functionality for handling access to a menu structure. The functionality of the operation key 8a depends on the present state of the phone. The operation key is arranged to perform a group of predetermined actions associated with a state. The default function or the present function of the operation key 8a can be displayed in a predetermined area 21 of the display 3, just above the key 8a.

The scroll key 10, which can also be called a navigation key, is an up/down key and is placed centrally on the front surface of the phone between the display 3 and the group of alphanumeric keys 7. Hereby the user will be able to control this key by simply pressing the up/down key using his/her thumb, i.e. it allows the user to scroll between a group of items in e.g. a menu provided in the user interface. Since many experienced phone users are used to one-hand control, it is a very good solution to place an input key, requiring precise motor movements. Thus, the user may place the phone in the hand between the finger tips and the palm of the hand. Hereby, the thumb is free for inputting information. In a preferred embodiment, the scroll key can be a roller key (not shown), which is arranged to rotate in one or several directions. The roller allows the user to roll the key to scroll between different items in a menu. In case of a roller key, the operation key 8a could be arranged to the roller, i.e. upon pressing on the roller the same functionality, as the operation key has, could be entered. The roller key is incorporated by reference in U.S. patent application Ser. No. 08/923,696.

Further, the scroll key 10 allows the user to scroll selectively between a group of items in a menu. This means that the user can select an item preceding or succeeding the item in the menu loop of the phone, while he/she can access a sub-menu loop under the item concerned in the menu loop by activation of the operation key 8a.

In some states, e.g. upon entering a phone number on the alphanumeric keypad 7, the other soft key 8b can be defined as a clear key, which may be used e.g. for erasing the last entered digit or letter by brief depression on the clear key 8b. If the clear key 8b being depressed under a longer duration the entire number or word will be erased. Like the operation key 8a, the scroll key 10 and the clear key 8b may advantageously be redefined in some states, which will be apparent from FIG. 3.

Although it is shown in the preferred embodiment that many of the functions of the phone might be controlled by the operational key 8a, it sometimes can be expedient to use two or more operational keys in the second group of keys, which can be integrated in a touch-sensitive display (not shown).

The two call handling keys 9 according to the preferred embodiment are used for establishing a call or a conference call, terminating a call or rejecting an incoming call.

Figure 2:
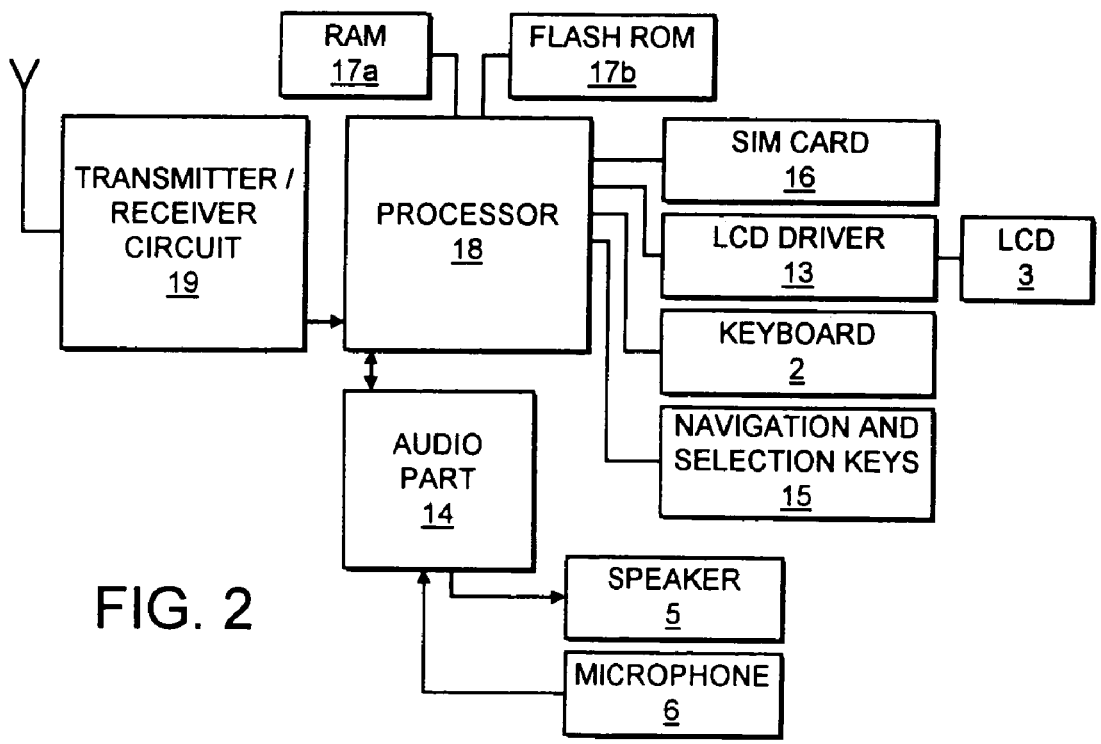

FIG. 2 schematically shows the most essential parts of a preferred embodiment of the phone. These parts being essential to understand the invention. The preferred embodiment of the phone of the invention is adapted for use in connection with a GSM network, but, of course, the invention may also be applied in connection with other phone networks, such as other kinds of cellular networks and various forms of cordless phone systems or in dual band phones accessing sets of these systems/networks. The microphone 6 records the user's speech, and the analogue signals formed thereby are A/D converted in an A/D converter (not shown) before the speech is encoded in an audio part 14. The encoded speech signal is transferred to control means 18. The control means 18 comprises a processor, which may support software in the phone. The control means 18 also forms the interface to the peripheral units of the apparatus, wherein the peripheral units can comprise a RAM memory 17a and a Flash ROM memory 17b, a SIM card 16, the display 3 and the keypad 2 (as well as data, power supply, etc.). The control means 18 communicates with a transmitter/receiver means 19, e.g. a circuit which is adapted to send/receive a request/respond to/from a telecommunication network. The audio part 14 speech-decodes the signal, which is transferred from the control means 18 to the earpiece 5 via a D/A converter (not shown).

The control means 18 is connected to the user interface. Thus, it is the control means 18 which monitors the activity in the phone and controls the display 3 in response thereto, in order to display the plurality of states which is assumed by the radiophone. Therefore, the control means 18 is arranged to detect the occurrence of a state change event, and changes the state of the radiophone. This state change event will affect the functionality of the operation key, and redefine it, in response to the preceding state and the nature of the detected state change event. Thus, this may also cause a change of the display text. A state change event may be caused by the user when he presses on the keypad, as shown in FIG. 1. These type of state change events are called entry events or user events. Also, the network communicating with the phone may cause a state change event. This type of event and other events beyond the user's control are called non user events. Non user events comprise status change during call set-up, change in battery voltage, change in antenna conditions, message on reception of SMS, etc.

The phone can assume a plurality of predetermined states, which is shown as examples with reference to FIG. 3. A plurality of actions may be performed in these states. The display image in a state may be a phone number or the name of a person contained in the phone book of the phone, which is indicated by "state". "State" might also cover "incoming calls", "E-mail received", "SMS received", etc. If the display contains a phone number, the default function might be "call". The scroll key in FIG. 1 allows switching from the default function to the group of possible functions, to which the default function belongs. The scroll key toggles between the default function and the group of possible functions (options). An example of toggling can be when the user browses among the different menus. Also, the scroll key switches between items in the group of possible functions, once this group has been selected by means of the operation key. An example of switching can be when the user scrolls over a group of items, e.g. names and/or numbers in a built-in phone book database. The state is maintained during toggling and scrolling through the options. One of the plurality of states is an idle state, even called idle mode. In idle mode the two soft keys of the phone may allow access to the menu structure and the phone book, respectively. The function of the soft key 8, as shown in FIG. 1, in the idle mode is to provide access to the main menu loop of the phone.

A state change event will result in a change from one state to another. The new state depends on the old state and the nature of the state change event. During an established call ("call established" state), the default function of the operation key 8 can be "end". If a new incoming call "is waiting", the user may use the scroll key 9 to change state to a list of options, including items such as "end", "join", "answer" and "swap" without interrupting the call.

Each state is associated with a predefined group of functions, actions and/or options. An action can also give access to different functions and/or options of a state. Establishment of conference calls, e.g., can be performed only when a call has already been established. A preferred function serving as the default function can be designated in each of these groups. This designation may be performed by a programmer during programming, by the user through his redefinition of the default function, or by the phone itself. If the phone itself designates a function, the phone may record the frequency of the use of the individual functions and appoints the most frequently used one in each group as the default function.

When the phone changes its state, the operation key can perform the default function if it is activated, and the user may toggle between the default function and the whole group of options by means of the scroll key. If the group of options is selected with the operation key, the user will be able to scroll through the group of options with the scroll key and to select the desired (designated) function with the operation key. When a function is selected with the operation key, the control means 18 runs the associated program sequence to execute the function.

A state change event will result in a change from one state to another. The new state depends on the old state and the nature of the state change event. During an established call ("call established" state), the default function of the operation key 8 can be "end". If a new incoming call "is waiting", the user may use the scroll key 10 to change state to a list of options, including items such as "end", "join", "answer" and "swap" without interrupting the call.

The User Interface

Figure 3A:
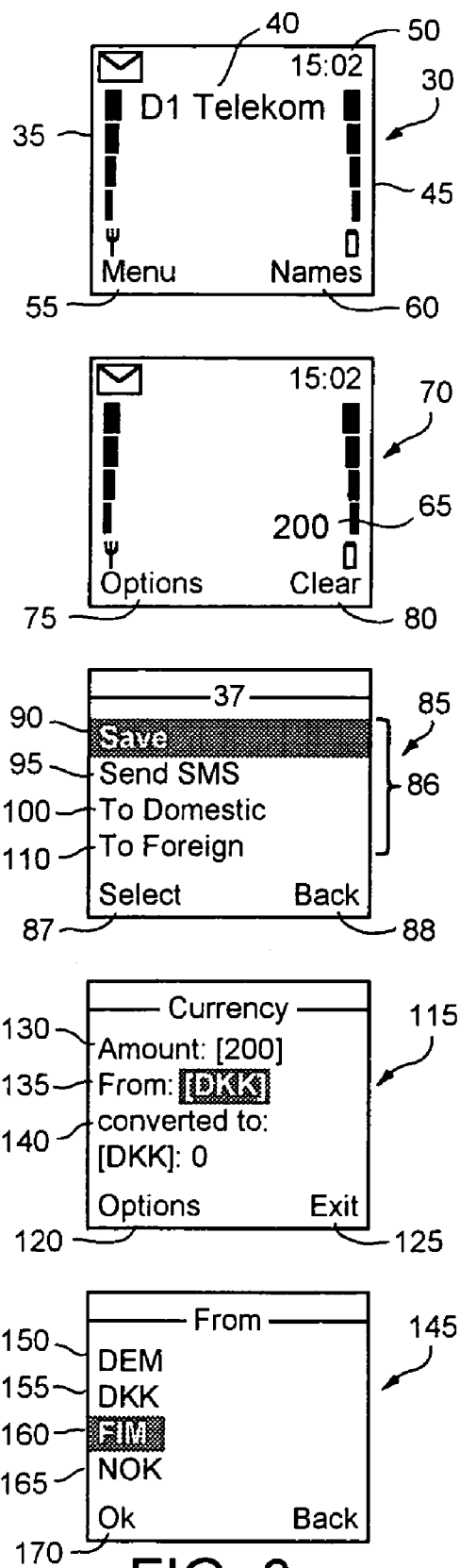

With reference to FIGS. 3a and 3b, an example is shown on how the display in a user interface can act in idle mode 30 according to the present invention. The user interface may comprise the same elements as shown in FIG. 1, i.e. a keypad 2, a display 3, an on/off button 4, a speaker 5 and a microphone 6. Also, it is the control means 18 in FIG. 2 which controls the user interface. Starting from FIG. 3a, there is a layout 30 presented of a display in a phone, as shown in FIGS. 1 and 2, which indicates signal strength 35 from the wireless telecommunication network "D1 Telekom" 40, the battery power 45 and a clock showing the time 50 in hours and minutes. Preferably, the display in the phone is an LCD (Liquid Crystal Display) display. The display, can be controlled by the control means 18 as shown in FIG. 2. The layout 30 presents an example of the phone in idle mode 30, i.e. a state when the phone is activated and awaiting an action, e.g. by pressing an alphanumeric key, receiving an incoming call or establishing an outgoing call. In the bottom of the display there are two items which are denoted as "Menu" 55 and "Names" 60, which defines the functionality of the two soft keys shown in FIG. 1, wherein the "Menu" 55 in this example is referring to the operational key. If the user selects "Names" 60 he/she can e.g. access a built in phone book. If the user selects "Menu" 55, he/she can select among several different menus. The actual selection of features in the bottom of the display, like "Menu" and "Names", can be selected by means of the soft keys as is disclosed with reference to FIG. 1.

When the user presses on one of the keys on the first group of keys, as defined with reference to FIG. 1, the control means detects the state change event, changes the state of the radiophone and redefines the functionality of the operational key (see FIG. 1). In this example, the user has given an input of the integer "200" 65, as shown in the layout 70. The operational key is changed from "Menu" 55, as shown in the previous layout 30, to "Options" 75. The other soft key has also changed its function from "Names" 60 to "Clear" 80. the functionality of the "Clear" key is to erase the last entered digit or letter by a brief depression on the clear key. If the clear key is depressed for a letter by a brief depression on the clear key. If the clear key is depressed for a longer duration the entire number or word will be erased. Naturally, the operation key, may be redefined as the clear key instead, and vice versa. In this example, it is default to enter integers upon pressing on one of the first group of keys. However, as an alternative input in idle state, it could be possible to redefine the first group of keys to enter letters instead of integers.

In accordance with the present invention, the next layout 85, shows the state after the user has pressed on the operational key having the functionality as "Menu" 75. This layout 85 is a menu 86 comprising a group of items, which are selectable by the scroll key from FIG. 1. The operational key is changed from "Options" 75, as shown in the previous layout 70, to "Select" 87. The other soft key has also changed its function from "Clear" 80 to "Back" 88. The "Back" 88 key changes the state back to the previous layout. The scroll key in FIG. 1 allows switching from the default item to the other items in the group. The state is maintained during switching and scrolling through the options. The items defines different functions (options) available in the phone, which are related to an input from the first group of keys.

In a preferred embodiment, a default item, might be "Save" 90. The save function 90 allows the user to save a record of the number in a phone book. The phone book is a phone number database stored in memory means, e.g. on the SIM (Subscriber Identity Module) card of the phone or in the memory in the phone itself. It may also be possible to add the number to an existing name in the database. Other preferable items in the menu 86, might be to establish a call to the entered number, to send an SMS (Short Message Service) message, "Send SMS" 95, to convert currencies, "To Domestic" 100/"To Foreign" 110, and/or to use a built-in calculator for processing the entered number in a calculation. All these features can be operatively arranged to the control means. If the user chooses to convert currencies, e.g. "To Domestic" 100, he/she presses on the "Select" key 87, and the display changes to the state as shown in layout 115. The operational key is changed from "Select" 87, as shown in the previous layout 85, to "Options" 120. The other soft key has also changed its function from "Back" 88 to "Exit" 125. The "Exit" 125 key changes the state back to the previous layout. The layout can be provided with different editable fields and selection list placeholders, which in this example are shown in square brackets ([ ]).

Since the user has entered the number "200" in idle state, as shown in layout 75, the selected amount to be converted is set to 200, "Amount:[200]" 130. The selection which is highlighted can indicate a default state of the selection. Therefore, since the user in this example selected to convert the selected amount to a domestic currency, the default selection in this state is the currency which the user would like to convert from, "From: [DKK]" 135. The currency to convert to, "converted to [DKK]:" 140, is already set according to the user's domestic currency, as in this example is DKK.

In accordance with the present invention, the next layout 85, shows the state after the user has pressed on the operational key having the functionality as "Options" 75. This layout 85 is a menu 86 comprising a group of items, which are selectable by the scroll key from FIG. 1. The operational key is changed from "Options" 75, as shown in the previous layout 70, to "Select" 87. The other soft key has also changed its function from "Clear" 80 to "Back" 88. The "Back" 88 key changes the state back to the previous layout. The scroll key in FIG. 1 allows switching from the default item to the other items in the group. The state is maintained during switching and scrolling through the options. The items defines different functions (options) available in the phone, which are related to an input from the first group of keys.

The Decision Process

FIG. 4 shows a flow chart, in accordance with the present invention, describing the decision process in the control means in a phone. The control means are the same as described earlier with reference to FIG. 2. When the phone is activated and establishes, a wireless connection to a cellular network, e.g. when the phone roams to a new network, "START" 300, it is possible to establish a voice call and/or to communicate with different telecommunication services, e.g. WAP related services, i.e. a service which can be accessed from a server to the phone. By using this kind of service, it might be possible to obtain information from a server to the phone, e.g. by using SMS (Short Message Service), or a similar service.

When the phone is in idle mode, it communicates with a fixed station at regular intervals via paging messages to maintain the connection, and it monitors its peripheral units in the form of battery, keypad, etc. It is the control means which controls these activities, and when it detects an event, it checks whether the phone is to change its state, e.g. from the "idle mode state" to the "incoming call state". FIG. 4 illustrates this process, where the control means at stage 310 monitors and detects occurring events. If the control means identifies the event as a state change event at the decision stage 320, the control means identifies the new state at stage 330. The identification of the new state at stage 330 takes place by means of a state tree, and replaces the old display text by a new default function indication of the new text. The replacement of the display text takes place in stage 340. If a detected event is not a state change event, the control means returns to the detect stage 310 to search for a new event.

In accordance with the present invention, a state change event caused by an input of the first group of keys when the radiophone is in its idle state, will redefine the function of the operation key, by replacing the old display text as disclosed in step 340. Thereafter, if the following state change event is caused by an input by the operation key, the control means will detect the combination of these two state change events in the next step 350, and display of a menu comprising a group of items as shown in step 360. Thereafter, the process can be completed "END" 400. The group of items is selectable by the scroll key, and is arranged to facilitate the access to the plurality of states when the phone is in an idle state. In other words, when the phone is in an idle state and one of the first group of keys is pressed, preferably an alphanumeric key, the operational key will change its appearance and the display accordingly. Thereafter, if the user presses on the operational key, a menu comprising a group of items will appear on the display. The items will be selectable by using the scroll key. Naturally, if the no state change event is detected in step 350, the process can be completed "END" 400.

The invention is not limited to the above described and in the drawings shown examples of an embodiment but can be varied within the scope of the appended claims. For example, it is possible to have additional actions in the menu to process an input from the first group of keys. Another action could be to search for a name or a number in the database provided in the memory means.

What is claimed is:

1. A radiophone, said radiophone arranged to assume a plurality of states including an idle state, said radiophone comprising:

control means controlling the user interface;

said user interface provided with:

a display;

a keypad comprising:

a group of keys for at least one of a number and a character entry;

a scroll key for scrolling through selectable items; and two soft keys each having multiple functionality depending on the current state of the radiophone, the function of said two soft keys when pressed is controlled by the control means and displayed in the display in respective areas solely dedicated for displaying these functions;

said control means arranges a group of actions being allowable upon a state change event in idle state of the phone; and said control means upon detection of an alphanumeric data input as said state change event in the idle state of the radiotelephone, displays:

in the softkey display area for a first of the two softkeys, a menu to access said group of actions by pressing the first soft key for operating on said alphanumeric data input; and in the softkey display area for a second of the two softkeys, a menu to return to the idle state and clear said alphanumeric data input.

2. A radiophone according to claim 1, wherein the group of keys are alpha-numerical keys, wherein the control means determines whether the individual keys in the group of keys are in numerical or in alphabetic mode depending on the current state of the radiophone.

3. A radiophone according to claim 1, wherein the scroll key is a roller key, to scroll between several items in a menu.

4. A radio phone according to claim 3, wherein said several items in the menu comprises at least the following action to process a number, as was entered on the group of keys, to access a currency converter, in order to convert said number from one monetary unit to another, said currency converter being operatively arranged to said control means.

5. A radiophone according to claim 3, wherein said radiophone further comprises memory means, said several items in a menu comprising the following actions to process a number, as was entered by the group of keys, to save a record of the number in a database, provided in said memory means, and to establish a call to the number.

6. A radiophone according to claim 3, wherein said several items in the menu comprises at least the following action to process a number, as was entered on the group of keys, to access a calculator, in order to process said number in a calculation, said pocket calculator being operatively arranged to said control means.

7. A radiophone according to claim 1, wherein the state change event in idle state of the radiophone is caused by pressing a key included in said group of keys for at least one of a number and a character entry.

8. A radiophone according to claim 7, wherein a left soft key of said two soft keys changes a functionality label from "Menu" to "Options".

9. A radiophone according to claim 1, wherein the state change event in idle state of the radiophone is caused by entering a number by pressing a key included in said group of keys for at least one of a number and a character entry.

10. A radiophone, said radiophone arranged to assume a plurality of states including an idle state, said radiophone comprising:
   control means controlling the user interface;
   said user interface provided with:
      a display;
      a keypad comprising:
      a group of keys for at least one of a number and a character entry;
         a scroll key for scrolling through selectable items; and
      two soft keys each having multiple functionality depending on the current state of the radiophone, the function of said two soft keys when pressed is controlled by the control means and displayed in the display in respective areas solely dedicated for displaying these functions;
   said control means arranges a group of actions being allowable upon a state change event in idle state of the phone; and
   said control means upon detection of an alphanumeric data input as said state change event in the idle state of the radiotelephone, displays:
   in the softkey display area for a first of the two softkeys, a menu to access said group of actions by pressing the first soft key for operating on said alphanumeric data input; and
   in the softkey display area for a second of the two softkeys, a menu to return to the idle state and clear said alphanumeric data input; and
   wherein the scroll key is a roller key, to scroll between several items in a menu;
   said radiophone further comprises memory means, said several items in a menu comprising the following actions to process a number, as was entered by the group of keys, to save a record of the number in a database, provided in said memory means, and to establish a call to the number; and
   wherein said radiophone further comprises memory means, said several items in the menu comprising the following actions to process at least one of a number and at least one letter, as was entered by the group of keys to add at least one of said number and said letter to an existing name in the database, provided in said memory means and to send an SMS message.

11. A method for controlling a radiophone, said radiophone arranged to assume a plurality of states including an idle state, comprising:
   controlling a user interface of the radiophone, said user interface including a display, and a keypad that includes a group of keys for at least one of a number and a character entry, a scroll key for scrolling through selectable items, and two soft keys each having multiple functionality depending on the current state of the radiophone;
   controlling the function of said two soft keys when said two soft keys are pressed;
   displaying the function of said two soft keys in respective areas of said display solely dedicated for displaying these functions when said two soft keys are pressed;
   arranging a group of actions being allowable upon a state change event in idle state of the radiophone;
   detecting an alphanumeric data input as said state change event in an idle state of the radiophone;
   displaying, upon said detecting, in the softkey display area for a first of said two softkeys, a menu to access said group of actions by pressing the first soft key for operating on said alphanumeric data input; and
   displaying, upon said detecting, in the softkey display area for a second of the two softkeys, a menu to return to the idle state and clear said alphanumeric data input.

12. The method according to claim 11, wherein the group of keys are alpha-numerical keys, and further comprising determining whether the individual keys in the group of keys are in numerical or in alphabetic mode depending on the current state of the radiophone.

13. The method according to claim 11, wherein the scroll key is a roller key to scroll between several items in a menu.

14. The method according to claim 13, further comprising:
   entering a number on the group of keys; and
   accessing a currency converter in order to convert the number from one monetary unit to another, said currency converter access being one of said several items in the menu.

15. The method according to claim 13, further comprising:
   entering a number on the group of keys;
   saving a record of the number in a database provided in a memory means in said radiophone; and
   establishing a call to the number, said record saving and said call establishing each being one of said several items in the menu.

16. The method according to claim 13, further comprising:
   entering a number on the group of keys; and
   accessing a calculator in order to process said number in a calculation, said calculator access being one of said several items in the menu.

17. The method according to claim 11, further comprising pressing a key included in said group of keys for at least one of a number and a character entry causing the state change event in idle state of the radiophone.

18. The method according to claim 17, wherein a left soft key of said two soft keys changes a functionality label from "Menu" to "Options".

19. The method according to claim 11, further comprising entering a number by pressing a key included in said group of keys for at least one of a number and a character entry causing the state change event in idle state of the radiophone.

20. A method for controlling a radiophone, said radiophone arranged to assume a plurality of states including an idle state, comprising:
   said radiophone arranged to assume a plurality of states including an idle state, comprising controlling a user interface of the radiophone, said user interface including a display, and a keypad that includes a group of keys for at least one of a number and a character entry, a scroll key for scrolling through selectable items, and two soft keys each having multiple functionality depending on the current state of the radiophone;

controlling the function of said two soft keys when said two soft keys are pressed;

displaying the function of said two soft keys in respective areas of said display solely dedicated for displaying these functions when said two soft keys are pressed;

arranging a group of actions being allowable upon a state change event in idle state of the radiophone;

detecting an alphanumeric data input as said state change event in an idle state of the radiophone;

displaying, upon said detecting, in the softkey display area for a first of said two softkeys, a menu to access said group of actions by pressing the first soft key for operating on said alphanumeric data input; and displaying, upon said detecting, in the softkey display area for a second of the two softkeys, a menu to return to the idle state and clear said alphanumeric data input;

wherein the scroll key is a roller key to scroll between several items in a menu; and further comprising entering a number and a letter on the group of keys, adding at least one of the number and the letter to an existing name in a database, provided in a memory means in said radiophone, and sending an SMS message, said adding and said sending each being one of said several items in the menu.

* * * * *